United States Patent
Mongillo, Jr.

(10) Patent No.: US 11,788,416 B2
(45) Date of Patent: Oct. 17, 2023

(54) GAS TURBINE ENGINE COMPONENTS HAVING INTERLACED TRIP STRIP ARRAYS

(71) Applicant: RTX Corporation, Farmington, CT (US)

(72) Inventor: Dominic J. Mongillo, Jr., West Hartford, CT (US)

(73) Assignee: RTX CORPORATION, Farmington, CT (US)

(*) Notice: Subject to any disclaimer, the term of this patent is extended or adjusted under 35 U.S.C. 154(b) by 89 days.

(21) Appl. No.: 17/345,246

(22) Filed: Jun. 11, 2021

(65) Prior Publication Data
US 2021/0301668 A1    Sep. 30, 2021

Related U.S. Application Data

(63) Continuation-in-part of application No. 16/261,745, filed on Jan. 30, 2019, now abandoned.

(51) Int. Cl.
*F01D 5/18*    (2006.01)

(52) U.S. Cl.
CPC ........ *F01D 5/187* (2013.01); *F05D 2250/183* (2013.01); *F05D 2260/201* (2013.01);
(Continued)

(58) Field of Classification Search
CPC .......... F01D 5/186; F01D 5/187; F01D 5/188; F01D 5/189; F05D 2260/2212; F05D 2260/22141
See application file for complete search history.

(56) References Cited

U.S. PATENT DOCUMENTS

| 5,052,889 A | 10/1991 | Abdel-Messeh |
| 5,681,144 A * | 10/1997 | Spring .................... F01D 5/187 415/115 |

(Continued)

FOREIGN PATENT DOCUMENTS

| DE | 10316974 A1 | 11/2003 |
| EP | 1873354 A2 | 6/2007 |

(Continued)

OTHER PUBLICATIONS

European Search Report for European Application No. 20153852.7; Application Filing Date: Jan. 27, 2020; dated Jun. 12, 2020; 6 pages.

*Primary Examiner* — Topaz L. Elliott
*Assistant Examiner* — Michael K. Reitz
(74) *Attorney, Agent, or Firm* — CANTOR COLBURN LLP (57) ABSTRACT

Airfoils for gas turbine engines are describe. The airfoils include a leading edge having an interior surface with an inflection point line extending radially between a root and a tip of the airfoil. The inflection point line is defined at a location of minimum radii that separates a pressure side and a suction side of the airfoil body. An interlaced trip strip array is arranged along the leading edge and includes a chevron trip strip having an apex and ligaments extending from the apex to form a chevron shape and a skew trip strip arranged proximate to the chevron trip strip with a leading end proximate the inflection point line. The skew trip strip is positioned adjacent to the chevron trip strip such that a gap is formed between the skew trip strip and one of the ligaments of the chevron trip strip.

20 Claims, 8 Drawing Sheets

(52) U.S. Cl.
CPC ............... *F05D 2260/2212* (2013.01); *F05D 2260/22141* (2013.01)

(56) References Cited

U.S. PATENT DOCUMENTS

| | | | |
|---|---|---|---|
| 5,791,405 A | | 8/1998 | Takiura et al. |
| 6,089,826 A | * | 7/2000 | Tomita .................... F01D 5/187 |
| | | | 415/115 |
| 6,406,260 B1 | * | 6/2002 | Trindade ................. F01D 5/187 |
| | | | 415/115 |
| 7,373,778 B2 | | 5/2008 | Bunker et al. |
| 9,157,329 B2 | | 10/2015 | Nadeau et al. |
| 10,107,128 B2 | | 10/2018 | Romanov et al. |
| 2005/0025623 A1 | * | 2/2005 | Botrel ..................... F01D 5/187 |
| | | | 416/97 R |
| 2007/0297916 A1 | | 12/2007 | Levine et al. |
| 2007/0297917 A1 | * | 12/2007 | Levine .................... F01D 5/187 |
| | | | 416/96 R |
| 2015/0300201 A1 | | 10/2015 | Koonankeil et al. |
| 2016/0003055 A1 | | 1/2016 | Ghigliotty et al. |
| 2017/0226884 A1 | | 8/2017 | Ratzlaff et al. |
| 2017/0226885 A1 | | 8/2017 | Clum et al. |
| 2020/0240275 A1 | | 7/2020 | Mongillo, Jr. |

FOREIGN PATENT DOCUMENTS

| | | |
|---|---|---|
| EP | 3088100 A1 | 11/2016 |
| EP | 3091182 A1 | 11/2016 |

\* cited by examiner

GAS TURBINE ENGINE COMPONENTS HAVING INTERLACED TRIP STRIP ARRAYS

CROSS-REFERENCE TO RELATED APPLICATIONS

This application is a continuation-in-part application of the legally related application U.S. Ser. No. 16/261,745, filed Jan. 30, 2019, the contents of which are incorporated by reference herein in their entirety.

BACKGROUND

Illustrative embodiments pertain to the art of turbomachinery, and specifically to turbine rotor components.

Gas turbine engines are rotary-type combustion turbine engines built around a power core made up of a compressor, a combustor, and a turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external sidewalls and/or internal to the airfoil. Such cooling cavities are subject to both hot material walls (exterior or external) and cold material walls (interior or internal). Further, different cooling schemes may be necessary for blades and vanes due to operational parameters, environment, and/or conditions. Although such cavities are designed for cooling portions of airfoil bodies, improved cooling designs may be desirable.

BRIEF DESCRIPTION

According to some embodiments, airfoils for gas turbine engine are provided. The airfoils include an airfoil body having a leading edge defining an internal cavity, wherein an interior surface of the internal cavity along the leading edge comprises an inflection point line extending radially between a root and a tip of the airfoil, wherein the inflection point line is defined at a location of minimum radii that separates a pressure side and a suction side of the airfoil body, and an interlaced trip strip array arranged within the internal cavity. The interlaced trip strip array includes a chevron trip strip having an apex, a first ligament extending from the apex in a first direction, and second ligament extending from the apex in a second direction that is different from the first direction to form a chevron shape and a skew trip strip arranged proximate to the chevron trip strip, wherein the skew trip strip has a leading end and a trailing end, wherein the leading end of the skew trip strip is proximate the inflection point line and the skew trip strip angles away from the inflection point line in a flow direction. The skew trip strip is positioned adjacent to the chevron trip strip such that a gap is formed between the skew trip strip and a respective one of the first ligament and the second ligament.

In addition to one or more of the features described herein, or as an alternative, further embodiments of the airfoils may include that the interlaced trip strip array comprises a plurality of the chevron trip strips and a plurality of the skew trip strips.

In addition to one or more of the features described herein, or as an alternative, further embodiments of the airfoils may include that the gap is formed between the trailing end of the skew trip strip and the respective one of the first or second ligaments of the chevron trip strip.

In addition to one or more of the features described herein, or as an alternative, further embodiments of the airfoils may include that the gap is between 8 mil and 30 mil.

In addition to one or more of the features described herein, or as an alternative, further embodiments of the airfoils may include that a line drawn from the trailing end of the skew trip strip to the respective first or second ligament intersects the ligament at a position between 50% and 100% of the length of the respective first or second ligament of the chevron trip strip from the apex of the chevron trip strip.

In addition to one or more of the features described herein, or as an alternative, further embodiments of the airfoils may include that the line drawn from the trailing end to the respective first or second ligament intersects at a 90° angle.

In addition to one or more of the features described herein, or as an alternative, further embodiments of the airfoils may include that the skew trip strip is located on an upstream side of the chevron trip strip in a flow direction through the internal cavity.

In addition to one or more of the features described herein, or as an alternative, further embodiments of the airfoils may include that the skew trip strip is located on a downstream side of the chevron trip strip in a flow direction through the internal cavity.

In addition to one or more of the features described herein, or as an alternative, further embodiments of the airfoils may include that the leading end of the skew trip strip is arranged with an offset from the inflection point line.

In addition to one or more of the features described herein, or as an alternative, further embodiments of the airfoils may include that the offset is between 3 mil and 5 mil.

In addition to one or more of the features described herein, or as an alternative, further embodiments of the airfoils may include that the offset defines an uninterrupted section along the leading edge of the internal cavity that does not contain any surface features.

In addition to one or more of the features described herein, or as an alternative, further embodiments of the airfoils may include that the interlaced trip strip array is arranged on the pressure side of the leading edge cavity and defines a first interlaced trip strip array and a second interlaced trip strip array is arranged on the suction of the leading edge cavity.

In addition to one or more of the features described herein, or as an alternative, further embodiments of the airfoils may include that the first interlaced trip strip array comprises a plurality of first skew trip strips arranged along the inflection point line and the second interlaced trip strip array comprises a plurality of second skew trip strips arranged along the inflection point line.

In addition to one or more of the features described herein, or as an alternative, further embodiments of the airfoils may include that the leading edge of the first skew trip strips and the leading edge of the second skew trip strips are arranged with a radial offset.

In addition to one or more of the features described herein, or as an alternative, further embodiments of the airfoils may include that the radial offset is a non-zero pitch.

In addition to one or more of the features described herein, or as an alternative, further embodiments of the airfoils may include that the non-zero pitch is equal to ½ pitch.

In addition to one or more of the features described herein, or as an alternative, further embodiments of the airfoils may include that the non-zero pitch is equal to ⅓ pitch.

In addition to one or more of the features described herein, or as an alternative, further embodiments of the airfoils may include that the non-zero pitch is equal to ¼ pitch.

In addition to one or more of the features described herein, or as an alternative, further embodiments of the airfoils may include that the first skew trip strips are arranged upstream of respective chevrons of the first interlaced trip strip array and the second skew strip strips are arranged downstream of respective chevrons of the second interlaced trip strip array.

In addition to one or more of the features described herein, or as an alternative, further embodiments of the airfoils may include that a length of the skew trip strip, a length of the first ligament, and a length of the second ligament are all equal.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
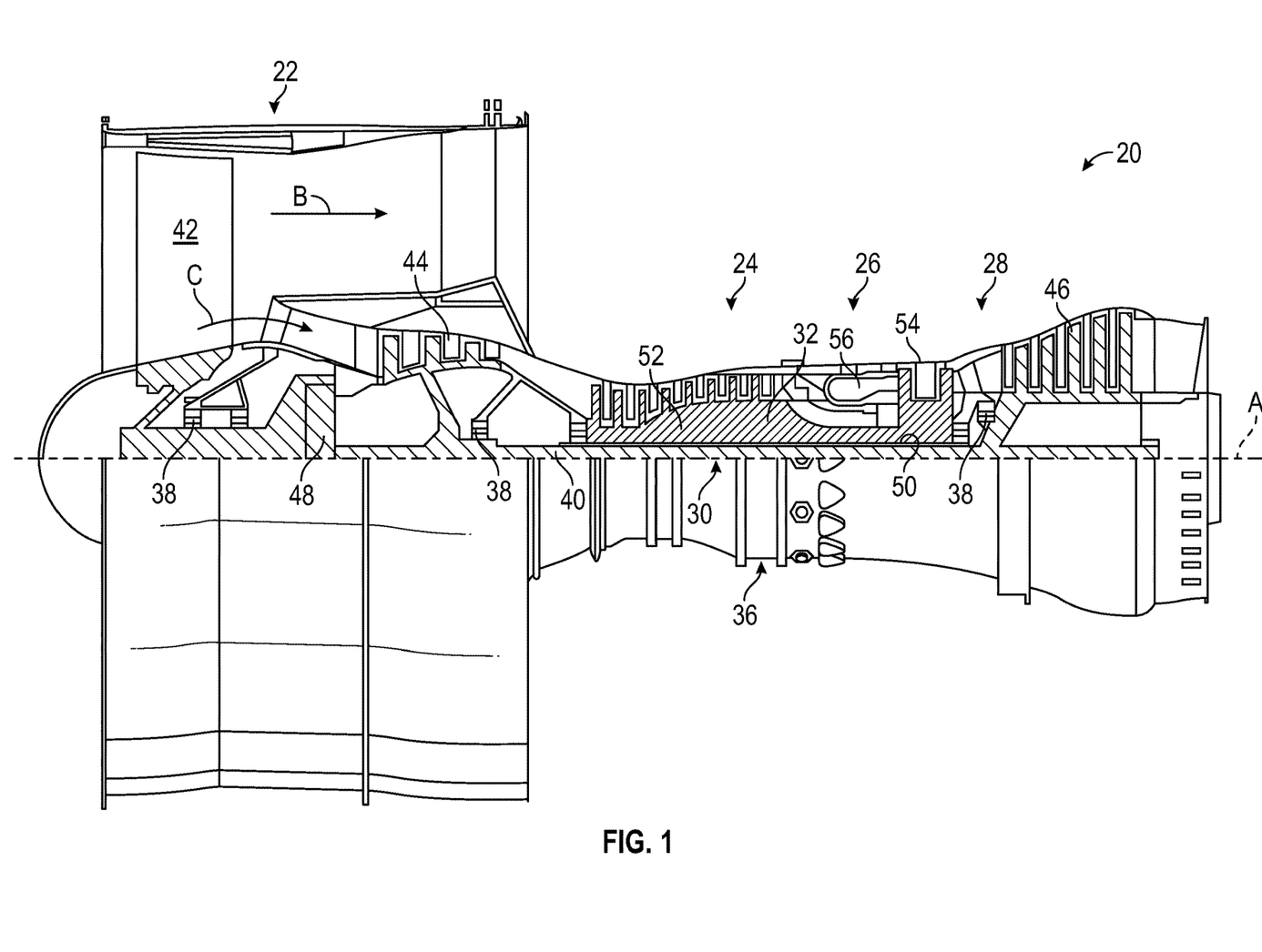
FIG. 1 is a schematic cross-sectional illustration of a gas turbine engine that can incorporate embodiments of the present disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28.

Although depicted as a two-spool turbofan gas turbine engine in the disclosed non-limiting embodiment, it should be understood that the concepts described herein are not limited to use with two-spool turbofans as the teachings may be applied to other types of turbine engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 can be connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system.

The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(514.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
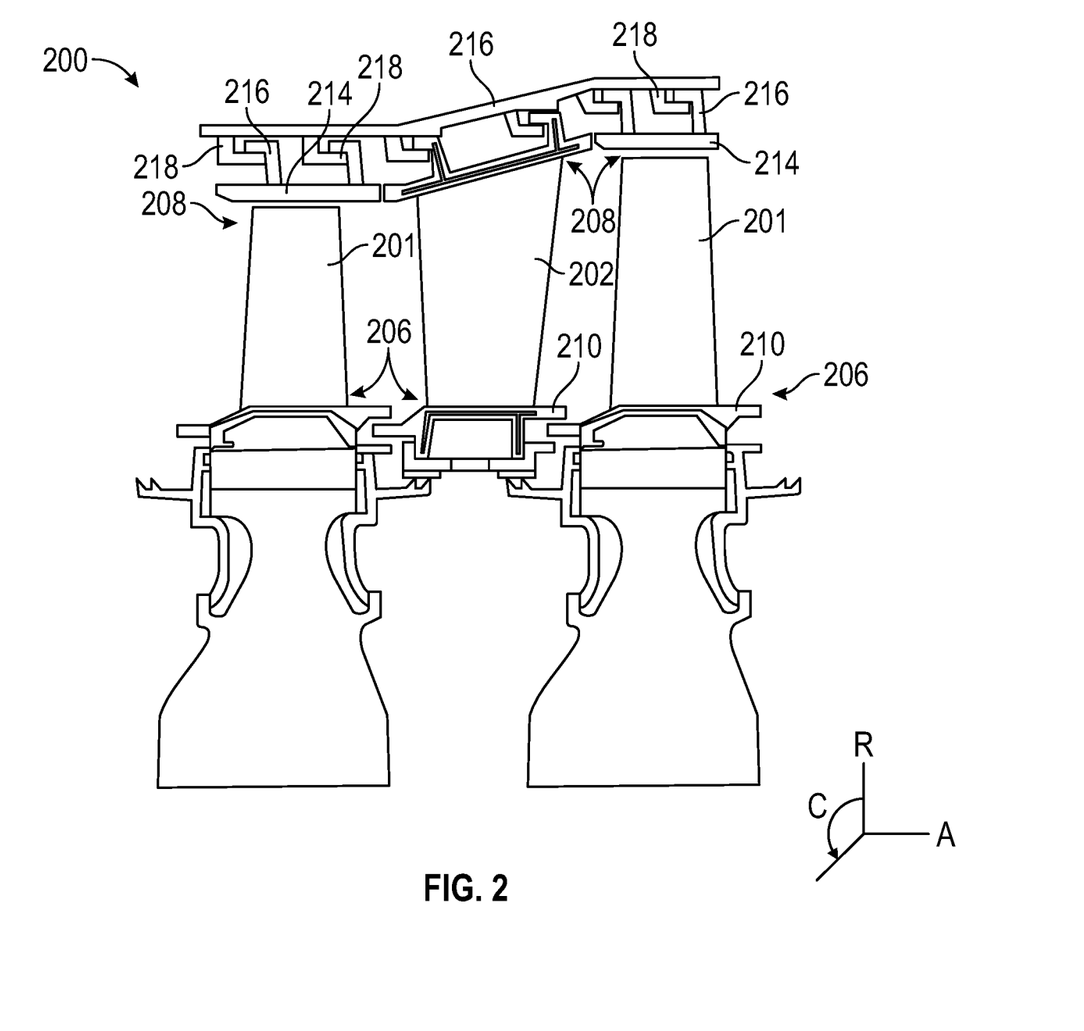
FIG. 2 is a schematic illustration of a portion of a turbine section of a gas turbine engine that can incorporate embodiments of the present disclosure.

FIG. 2 is a schematic view of a portion of a turbine section that may employ various embodiments disclosed herein. Turbine section 200 includes a plurality of airfoils, including, for example, one or more blades 201 and vanes 202. The airfoils 201, 202 may be hollow bodies with internal cavities defining a number of channels or cavities, hereinafter airfoil cavities, formed therein and extending from an inner diameter 206 to an outer diameter 208, or vice-versa. The airfoil cavities may be separated by partitions or internal walls or structures within the airfoils 201, 202 that may extend either from the inner diameter 206 or the outer diameter 208 of the airfoil 201, 202, or as partial sections therebetween. The partitions may extend for a portion of the length of the airfoil 201, 202, but may stop or end prior to forming a complete wall within the airfoil 201, 202. Multiple of the airfoil cavities may be fluidly connected and form a fluid path within the respective airfoil 201, 202. The blades 201 and the vanes 202, as shown, are airfoils that extend from platforms 210 located proximal to the inner diameter thereof. Located below the platforms 210 may be airflow ports and/or bleed orifices that enable air to bleed from the internal cavities of the airfoils 201, 202. A root of the airfoil may connect to or be part of the platform 210. Such roots may enable connection to a turbine disc, as will be appreciated by those of skill in the art.

The turbine 200 is housed within a case 212, which may have multiple parts (e.g., turbine case, diffuser case, etc.). In various locations, components, such as seals, may be positioned between the airfoils 201, 202 and the case 212. For example, as shown in FIG. 2, blade outer air seals 214 (hereafter "BOAS") are located radially outward from the blades 201. As will be appreciated by those of skill in the art, the BOAS 214 can include BOAS supports that are configured to fixedly connect or attach the BOAS 214 to the case 212 (e.g., the BOAS supports can be located between the BOAS and the case). As shown in FIG. 2, the case 212 includes a plurality of hooks 218 that engage with the hooks 216 to secure the BOAS 214 between the case 212 and a tip of the blade 201. Similarly, other hooks, as illustratively shown, are arranged to support the vane 202 within the case 212.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

Cooling of the airfoils 201, 202 may be achieved through internal cavities, as will be appreciated by those of skill in the art. Cooling air may be passed into and through the internal cavities, with the cooling air providing heat pick-up to remove heat from the hot material surfaces of the airfoil (e.g., external surfaces exposed to hot gaspath). The thermal transfer from the hot material to the cool air may be augmented using thermal transfer augmentation features, such as trip strips, pedestals, or other features, as will be appreciated by those of skill in the art. One such thermal transfer augmentation feature is a Chevron trip strip, forming a substantially "V" shape, with an apex and ligaments extending at approximate 90° from each other from the apex formed by the adjoining intersecting trip strip ligaments.

Both single and double Chevron trips strips have been used in various turbine airfoil cooling design concepts to enhance internal convective heat transfer. It has been shown both experimentally and analytically that Chevron trips strips promote higher convective heat transfer augmentation relative to conventional skewed trip strip turbulators, without incurring a significant increase in pressure loss. Chevron trips strips have been found to be beneficial for enhancing the average convective heat transfer by approximately 25% relative to conventional skewed trip strip arrays having the same streamwise pitch between consecutive trip strips.

However, there is a fundamental technical disadvantage when incorporating conventional chevron trip strips in that the location of maximum heat transfer occurs at the apex of the chevron. The apex, as noted above, is created by two nearly-orthogonal trip strip ligaments. Downstream of the apex, decay in convective heat transfer occurs along the streamwise length of each of the ligaments. If the ligaments are relatively "long," thickening of the thermal boundary layer occurs and can result in lower convective heat transfer augmentation. Such reduced convective heat transfer may be undesirable for an airfoil cooling design that is predominately convectively cooled. It has been realized that by reducing the length of each of the ligaments of the chevron trip strip, a higher integrated bulk convective heat transfer coefficient can be achieved.

Accordingly, chevron trip strip arrays (i.e., a plurality of chevron trip strips arranged long a flow path) can provide higher heat transfer augmentation along a flow path surface as compared to other heat transfer augmentation features (e.g., skew trip strips). Chevron trip strip arrays can be arranged as single arrays or double arrays. A single array is a series of chevron trip strips that are arranged in single file along a flow path. A double array is a series of dual-chevron trip strips that are arranged in single file along a flow path, with the dual-chevron comprising two adjacent chevron trip strips, which may be connected at ends of one ligament, or may be separate but adjacent chevron trip strips. The selection of use of a single array or a double array may depend, in part, on cooling flow, geometric characteristics of the cooling passage, (e.g., passage width, height, length, etc.) and/or upon requirements of thermal cooling effectiveness and convective heat transfer.

Utilizing only single or double arrays may be problematic in certain configurations. For example, only a single or only a double array may not be efficient when trying to incorporate chevron trip strip arrays in cooling channels that require maximum local convective heat transfer augmentation immediately adjacent to or coincident with a maximum external heat flux location that is not coincident with the apex of the chevron trip strip. This circumstance may be present for convectively cooled airfoil leading edge cooling cavities, such as those used for second stage high pressure turbine airfoils. Similarly, such circumstance may be present in BOAS configurations that utilize circumferentially flowing super convective shroud cooling channels. The circumferentially flowing super convective shroud cooling channels may be arranged immediately adjacent to the BOAS leading edge and trailing edge. In such BOAS configurations, these regions typically incur the highest external heat flux and do not inherently benefit locally from the integration of chevron trip strip arrays.

In accordance with embodiments of the present disclosure, gas turbine engine components (e.g., airfoils, BOAS, etc.) may incorporate skewed trip strips interlaced with chevron trip strip arrays in order to maximize the local internal convective heat transfer coincident with high external heat flux locations. Such multi-type trip strip configurations may be employed to optimize both the local and bulk convective heat transfer within a cooling channel passage (e.g., airfoil leading edge, BOAS leading/trailing edges).

The main benefits associated with chevron trip strips are primarily attributed to the reduction in the length of the each of the two ligaments that form the chevron trip strip shape and the pair of counter-rotating vortices generated by the chevron geometry shape. By minimizing the growth of the thermal boundary layer along the streamwise length of each of the ligaments the reduction in local convective heat transfer typically observed with longer ligaments may be mitigated. Chevron trip strip arrays also exhibit additional local heat transfer augmentation that occurs at the apex of each of the chevron trips where the two ligaments of each trip strip intersect to form the chevron shape. The location of the apex is typically arranged at or toward the middle/center of a cooling channel passage if a single row of chevron shaped geometries is incorporated. If a double row of chevrons is incorporated, the apex of each of the two adjacent chevron trips may be arranged at distances approximately ⅓ and ⅔ the cooling passage cavity width. It is important to recognize that each chevron row may have unique ligament lengths, which may vary in length in a streamwise flow direction due to changes in the cooling passage width. Such is the case with converging and/or diverging cooling channel geometries which are tailored to maintain and/or optimize the distribution of internal cavity Mach Number and Reynolds Number in order to achieve optimal convective thermal cooling and pressure loss characteristics.

In accordance with embodiments of the present disclosure, in order to maximize a local convective heat transfer, skewed trip strips are integrated or "interlaced" with a chevron trip strip array in order to better optimize the convective cooling characteristics of the combined array. For example, such interlaced skewed trip strips may address local high heat flux locations that may occur along the sides or edges of a rib-roughened wall surface in a cooling channel. Such rib-roughened wall surfaces may be present in convectively cooled leading edge cooling channels of airfoils and within the leading or trailing edge super convective shroud channels of a BOAS.

The interlaced trip strip arrangement described herein integrates a skewed trip strip with a chevron trip strip. The significance of this arrangement is that it allows for multiple locations of maximum internal convective heat transfer which coincide at the first point of contact between the internal cooling flow and the most "upstream" location of the trip strip surface. As such, the maximum heat transfer augmentation occurs at the "leading surface" of the skewed trip strip which is defined as the location of the trip strip feature that is furthest upstream or at the "first point" of contact. Similarly, for the chevron trip strip features, the location of maximum internal convective heat transfer occurs coincident with the location that forms the "apex" of the two intersecting leg segments of the chevron shape.

Those skilled in the art will also recognize that the resulting segment lengths of both the skewed trip strips and the chevron trip strips are shortened as compared to segment lengths that would result if each of the aforementioned trip strip features were distributed independently along the same internal cavity surface area (i.e., without the other trip strip feature present). That is, the length of the strip strips in accordance with the present disclosure are shortened as compared to trip strips of an array comprising only of skewed trip strips or an array comprising of only chevron trip strips.

By integrating and interlacing both the skewed and chevron trip strip geometries, the resulting shorter features, "trip segment lengths" reduce the local growth of the thermal boundary layer which occurs in the streamwise direction along the direction of each of the trip strip segments. As such, the reduced boundary layer growth results in a smaller decay rate of the local convective heat transfer coefficient along each of the skewed and chevron segments, and thereby results in a greater or larger integrated convective heat coefficient laterally along the internal roughened surface at any given streamwise location in the cooling passage. The interlaced skewed trip strips and chevron trip strips enable a large number of flow vortices to be formed. These flow vortices promote more turbulent mixing along each of the trip strip segments which in-turn enhances both the local and integrated bulk convective heat transfer coefficient along the internal rib-roughened wall surfaces.

A feature of the disclosed trip strip arrays is the relative position of the skewed trip strip relative to at least one leg segment that create the chevron trip shape. The skewed trip intersects nearly orthogonal to at least one leg segment of the chevron shape at a location that is approximately 50% to 100% of the total length of the leg segment. As such the individual vortices generated from the skewed trip and the at least one leg segment of the chevron trip strip feature will coalesce and increase in magnitude and strength thereby enhancing the turbulence intensity. The enhancement in the internal convective heat transfer increases both the local thermal cooling effectiveness as well as increases the overall convective efficiency of cooling passage.

Cooling channel passages requiring increases in both local and bulk convective heat transfer coefficients will benefit from the interlaced skewed-chevron trip strip arrays of the present disclosure. To achieve a desired (e.g., maximum) distribution of internal convective heat transfer, it is important to recognize that the skewed trip strips should be oriented relative to the chevron trip strips. For example, in accordance with embodiments of the present disclosure, a leading (i.e., upstream) edge or end of the skewed trip strip is oriented into the flow. Stated another way, the leading edge of the skewed strip is the first or furthest up-stream most point/location that comes in contact with an internal cooling flow in a streamwise direction. Similar to the apex location of chevron trip strips, the first point of contact of the skewed trip strips is the location at which the highest internal convective heat transfer is achieved.

After the first point of contact, the convective heat transfer along the trip strip surface is reduced (decayed) due to a thickening of the thermal boundary layer at a wall along the direction/orientation of the trip surface. The wall, in some embodiments, is a passage wall that is a hot exterior airfoil wall adjacent to or in contact with hot external freestream gas temperatures. The wall may be one which forms an airfoil pressure side, suction side, leading edge, and/or trailing edge surface. Similarly, in other embodiments, in the context of a BOAS application the wall may be a circumferentially flow leading or trailing edge surface of the BOAS.

In some configurations, if there are axial flow passages integrated into a BOAS cooling design, the wall may be define a Blade Arrival Edge (BAE) and/or Blade Departure Edge (BDE) bounding the circumferential length of the BOAS. Furthermore, in some embodiments, for example in the case of a blade tip, the wall may refer to the outermost tip surface of a rotating blade, which may come in contact with a BOAS surface during engine operation.

Figure 3A:
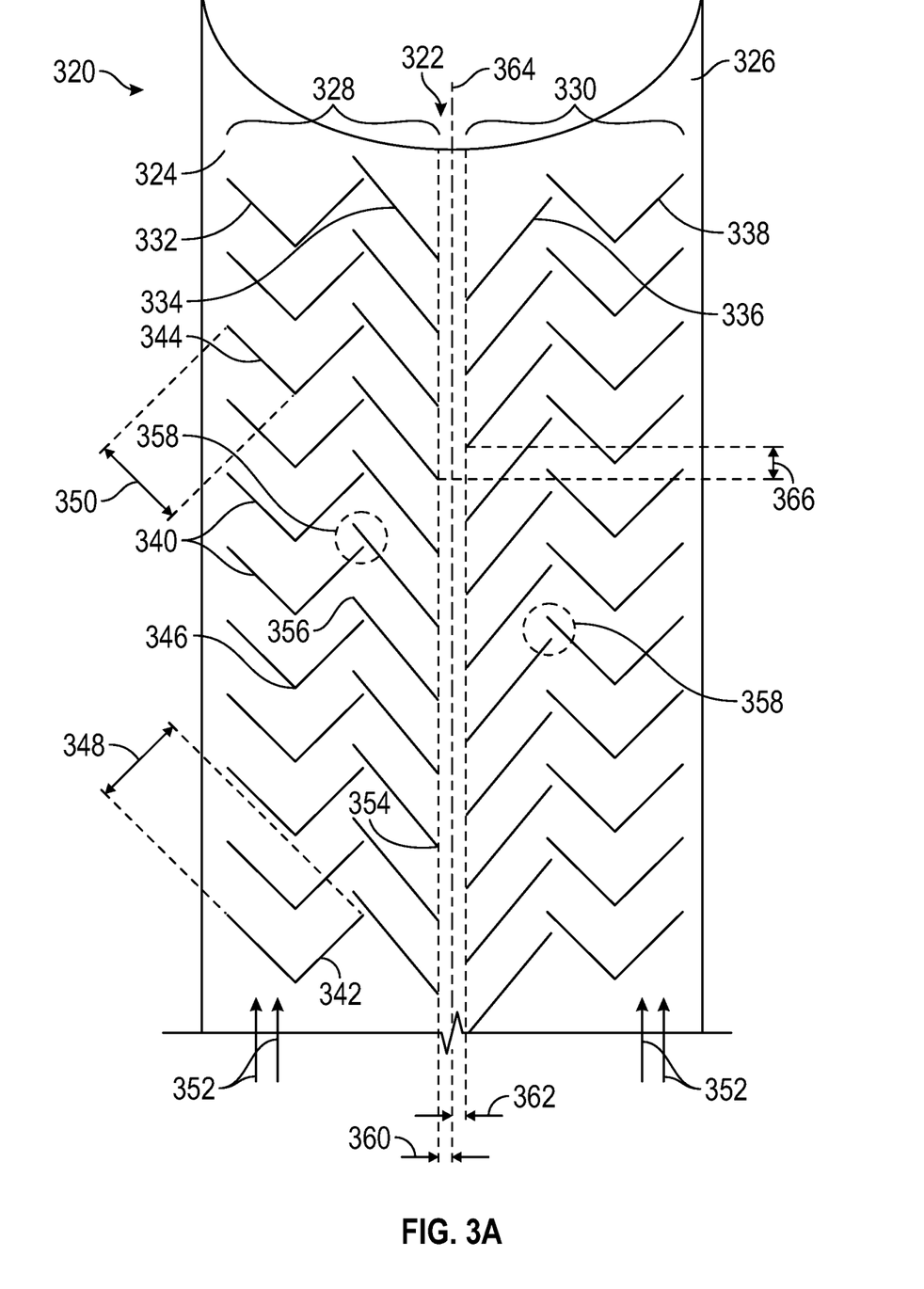
FIG. 3A is a schematic illustration of a leading edge of an airfoil in accordance with an embodiment of the present disclosure.
Figure 3B:
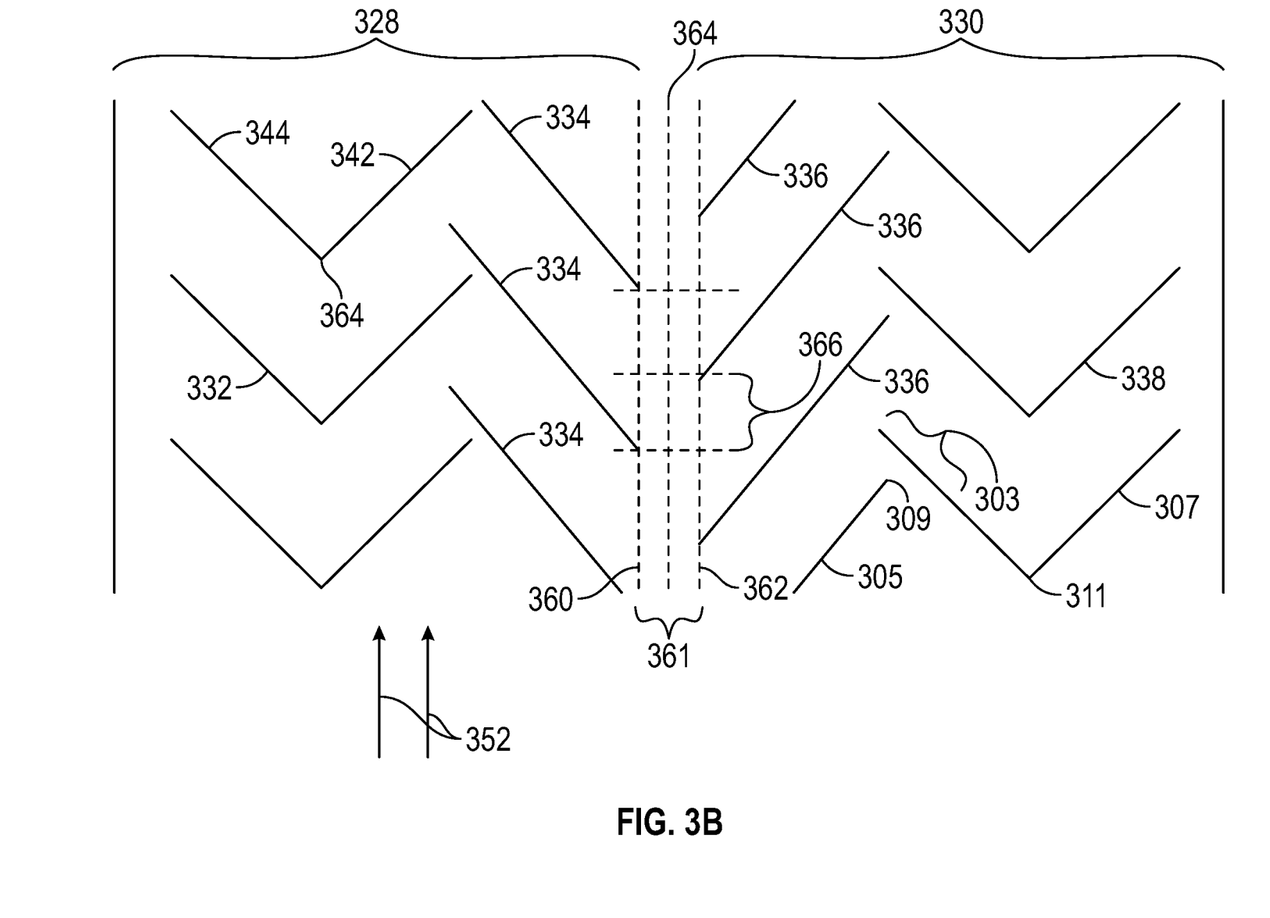
FIG. 3B is an enlarged illustration of a portion of the leading edge shown in FIG. 3A.
Figure 3C:
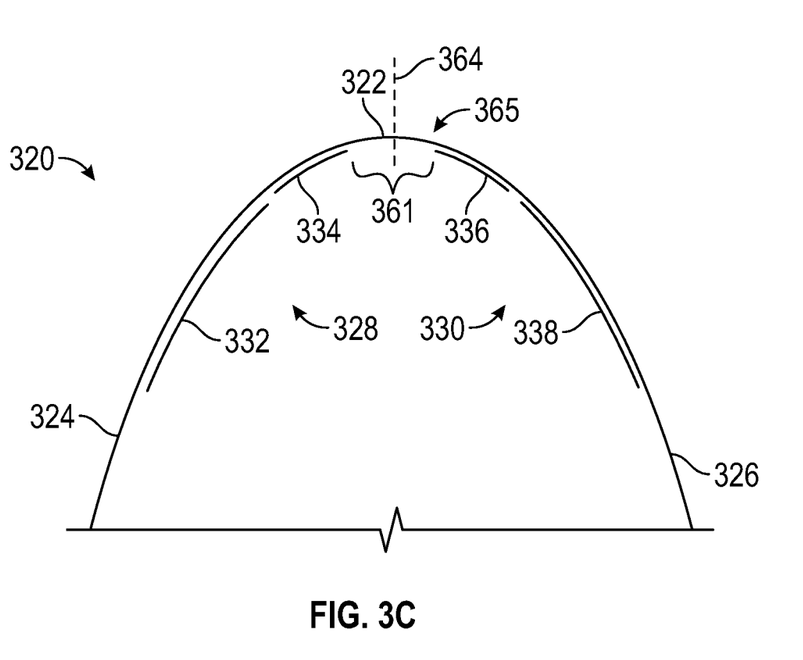
FIG. 3C is a schematic radially inward view of the leading edge shown in FIG. 3C.

Turning now to FIGS. 3A-3C, schematic illustrations of a portion of an airfoil 320 in accordance with an embodiment of the present disclosure are shown. FIG. 3A illustrates an internal surface of the airfoil 320 along a leading edge 322 thereof. FIG. 3B illustrates an enlarged view of the leading edge 322 of the airfoil 320. FIG. 3C is a radially inward cross-sectional view of the leading edge 322 of the airfoil 320. A suction side surface 324 and a pressure side surface 326 of a leading edge cavity of the airfoil 320 meet at the leading edge 322, and specifically at an inflection point line 364. The inflection point line 364 may be a core die parting line that is present due to the manufacturing process of the airfoil (e.g., to enable separation of cores).

In some embodiments, and as shown in FIG. 3C, the inflection point line 364 may be defined at an apex or change in curvature 365 from the pressure side surface 326 to the suction side surface 324 of the airfoil internal cavity passage surfaces. As such, in some embodiments, the inflection point line 364 may be defined at a point of smallest radius of curvature 365 along the interior surface of a leading edge cavity at the leading edge 322 and along an interior surface of an exterior wall of the airfoil 320. As shown in FIG. 3C, the suction side surface 324 includes a first interlaced trip strip array 328 and the pressure side surface 326 includes a second interlaced trip strip array 330. The interlaced trip strip arrays 328, 330 are arranged relative to the inflection point line 364. It is noted that FIG. 3C is a schematic illustration and there is a gap between the skew trip strips and the chevron trip strips of the trip strip arrays 328, 330. However, such gap would typically not be present due to the overlapping nature of the features, as described herein, and such gap is illustratively shown merely for clarity purposes.

In some embodiments, the inflection point line 364 may be coincident with a stagnation line that forms on an exterior surface of the airfoil when in operation. That is, the inflection point line 364 may be a line along an interior surface of the leading-edge cooling passage wall of the airfoil that may align with an exterior location on the exterior airfoil surface where the external freestream gaspath flow is stagnated. The external freestream flow will split and migrate into two distinctly different streamwise directions along the pressure side and suction side of the exterior surfaces of the airfoil. The stagnation line of the leading edge of the airfoil is defined as the location at which the external freestream flow exhibits local velocity of zero and thus it is said that the external freestream flow is stagnated. As such, the external flow that is incident upon the exterior airfoil leading edge splits toward the pressure side and suction side of the exterior surfaces of the airfoil. The stagnation line of an airfoil is defined at a precise location where the incident flow velocity is reduced to zero along the leading edge. The position of the stagnation line is a function of the angle of attack of the airfoil and axial and tangential velocity components of freestream flow directions which may be controlled by the turning of the freestream air induced by the upstream airfoil shape, aerodynamic loading, and relative axial spacing of the two consecutive airfoil rows (i.e., static and rotating). Those skilled in the art will appreciated that the stagnation line is not necessarily purely linear and that it may be curved and comprise multiple small inflection locations along the spanwise (radial) direction of the radially extending airfoil.

The location of the skewed trip strips, in accordance with embodiments of the present disclosure, may be oriented about the mechanical nose point of the leading-edge airfoil surface. Typically, the exterior leading-edge airfoil surface has a relatively small radius of curvature proximate or immediately adjacent to the mechanical nose point. The local small radius of surface curvature induces high local velocity gradients and acceleration of external flow along the airfoil surface, which in-turn results in high local Reynolds numbers and high external heat transfer coefficients and external heat flux. Similarly, the internal cooling passage (e.g., leading edge cavity) also includes a local small radius of surface curvature coincident with the local small radius of surface curvature of the external airfoil. In accordance with some embodiments, the skewed trip strip features may be located proximate a location where the internal cooling passage as has a relatively small radius of surface curvature (e.g., inflection point line 364), at a location coincident where the external heat flux induced by the locally small radii of curvature and accelerating external flow is greatest.

The upstream edge of the skewed trip strip location is defined and can then be pitched in a streamwise direction along the internal passage surface (e.g., in a radial direction from root to tip of the airfoil). With the skewed trip strip array being arranged along the inflection point line 364, a leg of at least one segment of a chevron trip strip can be positioned at a streamwise location that is approximately 50% of a skewed trip strip length offset from the streamwise pitch of the skewed trip strip array, as described below. Ideally the length of the skewed trip strip feature and each leg segment comprising the chevron shape are of comparable size. That is, the ratio of each or any of the trips strip lengths comprising the skewed or chevron shapes are approximately unity. It should be noted that the relative lengths of the skewed or chevron surfaces may vary depending on the size and shape of the internal cooling passage as it transitions from an inner flow path surface to an outer flow path surface.

As noted, in some embodiments, the inflection point line 364 and a core parting surface may be coincident so it makes sense from a design perspective that the highest internal heat transfer location which occurs at the most upstream point of contact on the trip strip be coincident with highest external heat load which is typically at the location of the inflection point line 364. Further, there will be instances where a stagnation point is not coincident with the parting line of the core die and/or the inflection point line 364. In these cases, the interlaced skewed trip strips may be shifted such that both sets of staggered skewed trip strips are located on only one half of the die surface. As such, it will be appreciated that the core die parting line is not necessarily synonymous with the demarcation of the airfoil pressure and suction side surfaces.

The first interlaced trip strip array 328 is formed from an array of first chevron trip strips 332 and an array of first skew trip strips 334, with the first skew trip strips 334 interlaced with the first chevron trip strips 332. The second interlaced trip strip array 330 is formed from an array of second chevron trip strips 336 and an array of second skew trip strips 338, with the second skew trip strips 338 interlaced with the second chevron trip strips 336. In each of the interlaced arrays 328, 330, the chevron trip strips 332, 336 are each formed from respective ligaments extending from an apex. For example, as shown, each chevron trip strip 340 of the array of first chevron trip strips 332 is formed with a first ligament 342 and a second ligament 344, with each trip strip 340 of the array of first chevron trip strips 332 being substantially the same in shape, orientation, and dimension. The first and second ligaments 342, 344 join at an apex 346 to form the chevron trip strip 340. In some embodiments, a length 348 of the first ligament 342 and a length 350 of the second ligament 344 are substantially equal.

As shown, adjacent to each chevron trip strip 340 of the first interlaced trip strip array 328 is a corresponding skew trip strip 334. Each set of adjacent chevron trip strips 332 and skew trip strips 334 form a pair of the first interlaced trip strip array 328. As shown in FIGS. 3A-3B, a flow direction 352 is in an upward direction on the page (e.g., radially outward from root to tip or radially outward from inner diameter to outer diameter of the airfoil). As such, the apex 346 of each chevron trip strip 332 is upstream of the ligaments 342, 344 that extend downstream therefrom. Each skew trip strip 334 of a pair of the first interlaced trip strip array 328 has a leading end 354 and a trailing end 356, with the leading end 354 being upstream of the trailing end 356. The skew trip strips 334 are arranged adjacent to, but not contacting, a respective chevron trip strip 340. As such, a gap 358 is formed between a ligament 342, 344 of a chevron trip strip 332 and an adjacent skew trip strip 334. In some embodiments, the gap 358 may be between 8 mil and 30 mil.

The arrangement of trip strips (e.g., 332, 334) allows for multiple locations of maximum internal convective heat transfer which coincide at the first point of contact between the internal cooling flow (e.g., flow along flow direction 352) and the most "upstream" location of the trip strip surface. For example, a maximum heat transfer augmentation occurs at the "leading surface" of the skewed trip strip 334 which is defined as the location of the skewed trip strip 334 that is furthest upstream or at the "first point" of contact with the flow. Similarly, for the chevron trip strips 334, the location of maximum internal convective heat transfer occurs coincident with the location that forms the apex 346 of the two intersecting leg segments 342, 344 of the chevron shape.

In some embodiments, if a line is drawn from the trailing end of a skew trip strip toward an adjacent leg of a chevron trip strip, the intersecting line may be at a position about 50% to 100% of the length of the leg of the chevron trip strip from the apex. This region is shown illustratively as intersecting region 303 in FIG. 3B. In FIG. 3B, a skew trip strip 305 is shown relative to an associated chevron trip strip 307. A downstream end 309 of skew trip strip 305 is arranged incident to a leg or ligament of the chevron trip strip 307 within the intersecting region 303, which is defined as the downstream ~50%400% of a total length of the ligament of the chevron trip strip 307 from an apex 311 thereof.

In this illustrative embodiment, the skew trip strip 334 of each first interlaced trip strip array 328 is located downstream from an associated chevron trip strip 332. That is, the first ligament 342 of a given chevron trip strip 340 is arranged upstream of the trailing end 356 of the associated skew trip strip 334. In the second interlaced trip strip array 330, the skew trip strips 336 are arranged upstream from an associated chevron trip strip 332. That is, a first ligament of a given chevron trip strip 336 is arranged downstream of a trailing end of an associated skew trip strip 336. As such, along the suction side surface 324 the first interlaced trip strip array 328 has the skew trip strips 336 downstream of the respective chevron trip strips 332 and the pressure side surface 326 includes the second interlaced trip strip array 330 having the skew trip strips 336 upstream of the respective chevron trip strips 338. However, it will be appreciated that the arrangement of a given pair of chevron and skew trip strips in an interlaced trip strip array in accordance with the present disclosure may depend on various considerations, including, but not limited to, channel width or spacing, thermal considerations, etc.

Also shown in FIG. 3A-3B is the arrangement of the first and second interlaced trip strip arrays 328, 330 relative to the leading edge 322, and the inflection point line 364 thereof. As shown, the first interlaced trip strip array 328 is offset from the inflection point line 364 by a first offset distance 360. Similarly, the second interlaced trip strip array 330 is offset from the inflection point line 364 by a second offset distance 362. The first and second offset distances 360, 362 may be the same distance or may be different, depending on the specific airfoil configuration and/or based on thermal considerations. In some embodiments, the first and/or second offset distances may be 3 mil or greater. In some embodiments, the first and/or second offset distances may be between 3 mil and 5 mil. Further, although shown in FIGS. 3A-3B with the skew trip strips 334, 336 of the first and second interlaced trip strip arrays 328, 330 being offset from the inflection point line 364, in other embodiments, the chevron trip strips 332, 338 of the first and second interlaced trip strip arrays 328, 330 may be arranged along and offset from the inflection point line 364. As a result of the offset distances 360, 362, the airfoil 320 includes a smooth, uninterrupted strip or uninterrupted section 361 along the line 364 having a width of the combined offset distances 360, 362, as shown in FIG. 3B. The uninterrupted section 361 may be provided with no interior surface features and thus may be a smooth surface that does not include heat augmentation features (e.g., no trip strips). In some embodiments, either or both of the skewed trip strips 336, 334 may extend to the inflection point line 364. In such embodiments, the uninterrupted section 361 may be omitted and such area may consist of extended trip strip features in order to promote local flow vortices and turbulence necessary to enhance the local convective heat transfer augmentation and thermal cooling effectiveness along this section/area.

The gap in embodiments of the present disclosure (e.g., gap 358) is formed, in part, due to the relative orientation of the skewed trip strip relative to the ligament of the chevron trip strip. In some embodiments, the orientation of the skew trip strip relative to the ligament of the chevron trip strip may be about 90° (i.e., the skew trip strip is oriented normal to a direction of the ligament of the chevron trip strip). Such orientation is substantially illustratively shown in the figures of this disclosure. However, this orientation is not to be limiting. That is, the relative orientation of the skew trip strip to the ligament of the chevron trip strip may have a variation of about +/−20° from normal, such that a line drawn from the skew trip strip to the ligament of the chevron trip strip may intersect at an acute, normal, or obtuse angle, depending on thermal dynamics and the specific configuration employed. Furthermore, the relative position of the interlaced skewed trip strip location and desired distance (position) along the ligament of the comprising the chevron trip strip may be varied based on the specific application, and the illustrative embodiments and drawings are not to be limiting, but rather are provided for example and teaching illustration only.

Furthermore, as shown in FIGS. 3A-3B, the skew trip strips 334 of the first interlaced trip strip array 328 may be offset in a radial (or flow) direction from the skew trip strips 336 of the second interlaced trip strip array 330. As such, a radial offset 366 between leading or upstream ends is defined in a radial direction (e.g., flow direction) between two substantially adjacent skew trip strips 334, 336 on either side of the inflection point line 364. That is, for two skew trip strips 334, 336 at substantially the same radial position along the leading edge 322 of the airfoil 320, the radial offset 366 defines a radial distance between the upstream or leading end of the respective skew trip strips 334, 336. The radial offset 366 is due, in part, to the skew trip strips 334 of the first interlaced trip strip array 328 being arranged downstream relative to a respective chevron trip strip 332 and the skew trip strips 336 of the second interlaced trip strip array 330 being arranged upstream relative to a respective chevron trip stirp 338. It is noted that the chevron trip strips 332, 338 of each of the first and second interlaced trip strip arrays 328, 338 are arranged at substantially the same radial position such that the apex of the chevron trip strips 332, 338 are at substantially the same radial position along the leading edge 322 of the airfoil 320.

In some embodiments, the radial offset 366 may be equal in both directions (e.g., radially inward and radially outward) for a single skew trip strip 336, the radial offset 366 may be the same distance for a skew trip strip 334 radially inward and a skew trip strip 334 radially outward from the skew trip strip 336. In some embodiments, the radial offset is a non-zero pitch distance in the radial direction (e.g., ¼ pitch, ⅓ pitch, ½ pitch, etc.).

Further, although shown and described with respect to a leading edge of an airfoil in FIGS. 3A-3B, embodiments of the present disclosure may be applied to other areas of airfoils or in other components of gas turbine engines.

Figure 4:
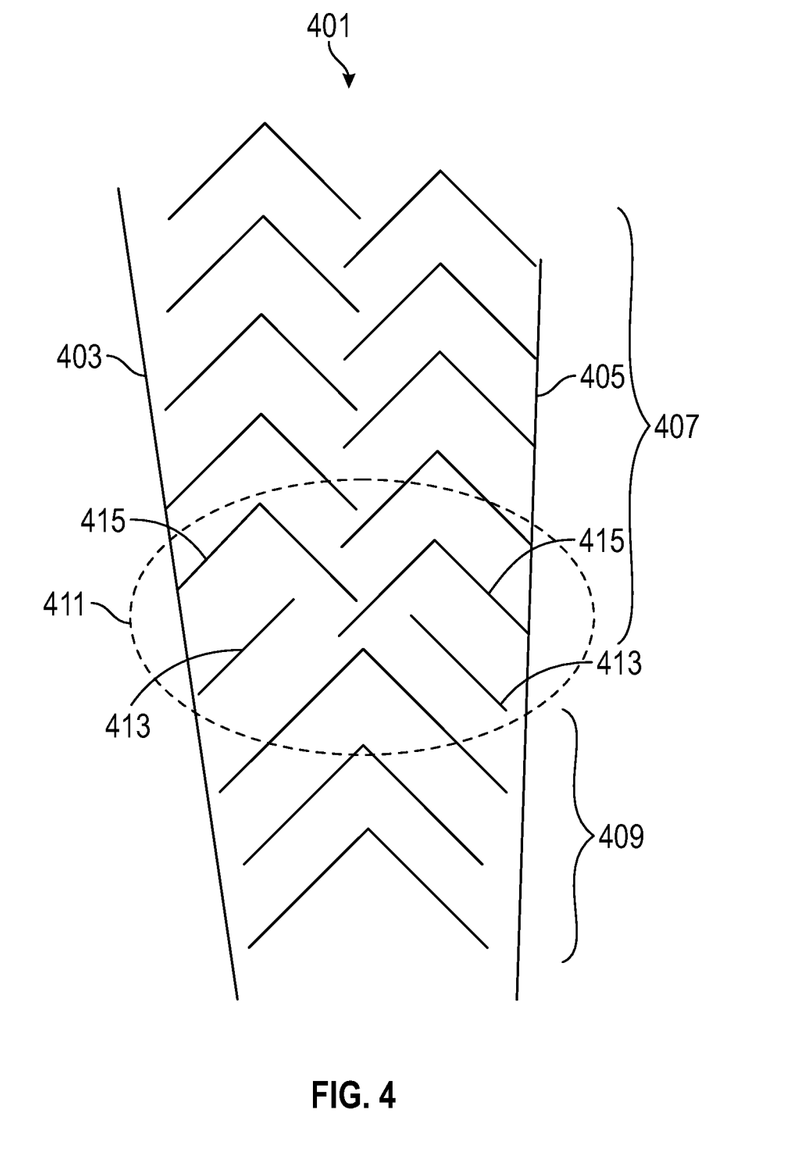
FIG. 4 is a schematic illustration of a serpentine cavity of an airfoil in accordance with an embodiment of the present disclosure.

For example, turning to FIG. 4, a schematic illustration of a surface of a serpentine cavity 401 of an airfoil. In this illustration, the serpentine cavity 401 is defined a first sidewall 403 and a second sidewall 405. The sidewalls 403, 405 defining the serpentine cavity 401 are tapered such that the serpentine cavity 401 narrows in a downstream direction. Because of the narrowing, the serpentine cavity 401 includes a dual-chevron array 407 at a wider, upstream portion, and a single-chevron array 409 at a narrower, downstream portion. At a transition from the dual-chevron array 407 to the single-chevron array 409 an interlaced trip strip array 411 may be arranged to provide for efficient thermal conditions at the transition between the upstream and downstream chevron arrays 407, 409.

In this embodiment, skew trip strips 413 of the interlaced trip strip array 411 are arranged within a respective chevron trip strip 415. That is, the skew trip strips 413 are arranged between ligaments of an associated chevron trip strip 415. However, similar to that shown and described in FIGS. 3A-3B, a leading end (relative to a flow direction) is arranged proximate a ligament of a respective chevron trip strip 415. The serpentine cavity 401 of FIG. 4 may be representative of application of embodiments of the present disclosure in any type of flow path that has a tapering feature, whether increasing or decreasing in a flow direction. That is, embodiments of the present disclosure may be implemented in any configuration that incorporates transition from one arrangement of trip strips to a different arrangement of trip strips (e.g., transition between a single-chevron array and a dual-chevron array).

As shown and described above, the interlaced trip strip arrays have included pairs of chevron trip strips with skew trip strips. That is, in the above described embodiments, one skew trip strip is arranged relative to an associated chevron trip strip. However, such configurations are not to be limiting. Further, although shown and described above as a transition between chevron trip strip arrays of different configurations, transitions incorporating embodiments of the present disclosure are not so limited.

Figure 5:
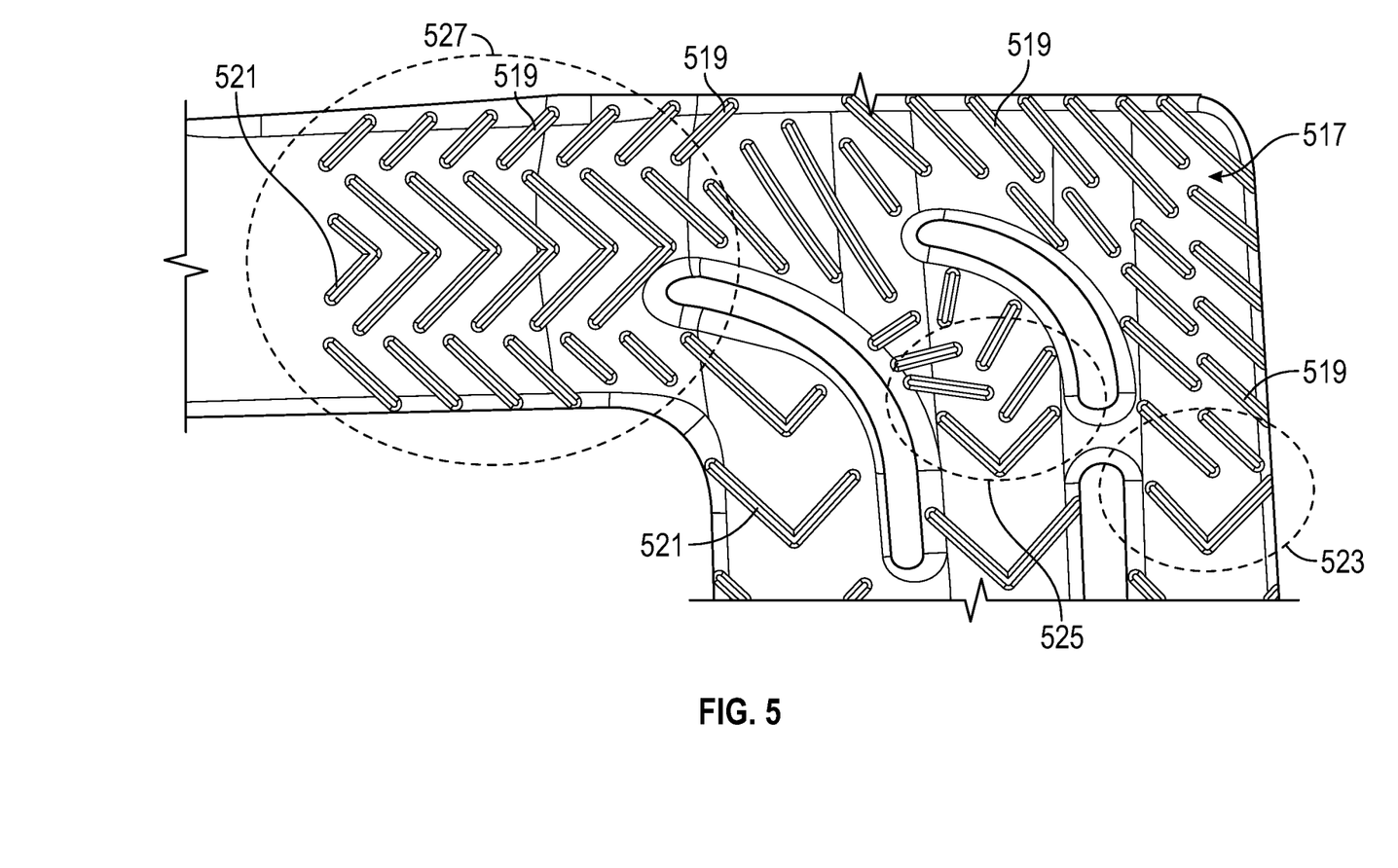
FIG. 5 is a schematic illustration of an internal cooling cavity of an airfoil in accordance with an embodiment of the present disclosure.

For example, turning now to FIG. 5, a schematic illustration of a cooling cavity 517 having various features in accordance with embodiments of the present disclosure. The cooling cavity 517 may be a cooling cavity of an airfoil wherein the cooling cavity transitions from a first direction (e.g., radial flow direction) to a second direction (e.g., axial flow direction). In some embodiments, the cooling cavity 518 includes a tip flag cavity that is at a tip of an airfoil, with FIG. 5 illustratively showing a transition from a radial flow through an airfoil body into a tip flag cavity to thus turn and flow axially. The cooling cavity 517 includes both skew trip strips 519 and chevron trip strips 521. As shown, first and second interlaced trip strip arrays 523, 525 are arranged at transitions between chevron trip strips and skew trips strips. Further, a third interlaced trip strip array 527 is arranged at a transition from both chevron and skew trip strips into the third interlaced trip strip array 527. The third interlaced trip strip array 527 includes a chevron trip strip with skew trip trips arranged on both sides or relative to each (both) ligaments of the chevron trip strips thereof.

In the above shown and described configurations, embodiments of the present disclosure are implemented in cooling channels or cavities of airfoils. However, as noted above, embodiments of the present disclosure may be implemented into other components of gas turbine engines. For example, turning now to FIG. 6, a schematic illustration of BOAS 670 in accordance with an embodiment of the present disclosure is shown. The BOAS 670 has a leading edge 672 and a trailing edge 674 and may be exposed to a hot gas path.

Figure 6:
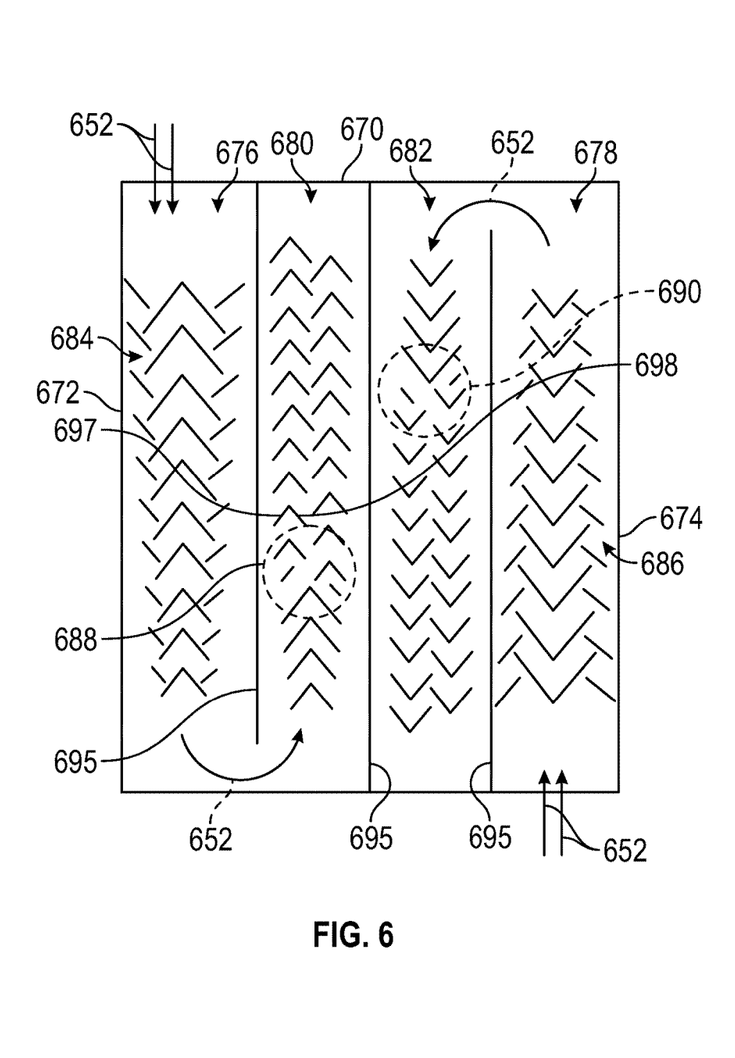
FIG. 6 is a schematic illustration of a portion of a blade outer air seal in accordance with an embodiment of the present disclosure.

The BOAS 670 includes a leading edge cavity 676 along the leading edge 672, a trailing edge cavity 678 along the trailing edge 674, and intermediate cavities 680, 682. As shown, the leading edge cavity 676 includes a first interlaced trip strip array 684, formed from a central line of chevron trip strips which have skew trip strips arranged adjacent to each of the ligaments of the chevron trip strips. The trailing edge cavity 678 has a second interlaced trip strip array 686, formed from a central line of chevron trip strips which have skew trip strips arranged adjacent to each of the ligaments of the chevron trip strips. The intermediate cavities 680, 682 each comprise two arrays with a transition therebetween, with the transitions being third and fourth interlaced trip strip arrays 688, 690, as shown.

As illustrated in FIG. 6, a cooling air flow 652 changes or alternates direction between successive cooling cavities 684, 680, 682, 678. In this illustrative configuration, the flow direction of the intermediate cavities 680, 682 is opposite the orientation of the apex of the chevron trips located therein. In this configuration, ligaments 697, 698 that form each chevron are first contacted by the internal cooling flow direction 652 at the extreme outer edges adjacent to rib partitions 695 which define and segregate circumferentially oriented cooling cavities 684, 680, 682, 678. In this configuration, the maximum internal convective heat transfer occurs immediately adjacent the circumferential rib partitions 695. The flow direction relative to the orientation of the chevron trip strips is opposite the conventional orientation, where the maximum convective heat transfer occurs at the apex of the chevron shape where the two ligaments intersect. The relative orientation between the direction of the cooling flow 652 and the chevron ligaments 697, 698, in this embodiment, can promote higher local convective cooling and thermal effectiveness thereby reducing the operating temperature of the rib partitions 695 during engine operation. The reduction in rib partition temperatures improves the creep capability of the BOAS and enables the retention of a conical shape of the BOAS segment by preventing radial distortion, mitigating potential thermal mechanical fatigue (TMF) cracking, and improving performance retention by maintaining optimal blade tip running clearances.

Figure 7:
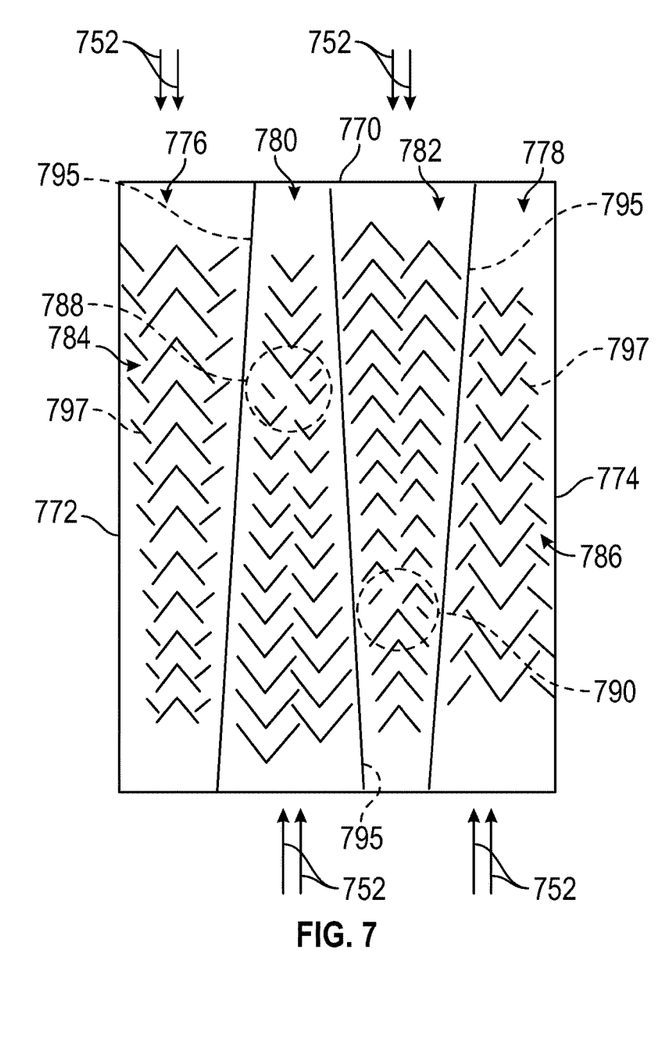
FIG. 7 is a schematic illustration of a portion of another blade outer air seal in accordance with an embodiment of the present disclosure.

Turning now to FIG. 7, an alternative design concept of a BOAS 770 incorporating alternating counter-flow Super Convective Shroud (SCS) circumferentially oriented cooling passages is shown. The cooling air 752 has a flow direction that initiates at the circumferential end of a cooling passage 776, 778, 780, 782 which has the largest flow area. The cooling passages 776, 778, 780, 782 are separated and defined, in part, by rib partitions 795, which define, in this illustrative embodiment, tapered or narrowing width cooling passages 776, 778, 780, 782 in the streamwise direction.

The cooling flow 752 travels in predominately a circumferential streamwise direction along the length of the respective cooling passage 776, 778, 780, 782 with converging flow area. The reduction in cooling flow area enables an increase in a bulk internal convective heat transfer due to increases in the local cavity Reynolds Number and Mach Number as a result of reduction in passage flow area in the streamwise direction. Interlaced trip strip arrays 784, 786 are arranged and oriented to maximize the local convective heat transfer along the BOAS surfaces at the leading edge 772 and the trailing edge 774 in order to mitigate high external heat flux observed at these axial and circumferential locations.

As previously stated, the maximum internal convective heat transfer will occur at the leading edge (upstream most) location of a skewed trip strip 797. Because the leading edge (upstream most) location of the skewed trip strip 797 is immediately adjacent to high heat flux locations the thermal cooling effectiveness along the leading edge 772 and trailing edge 774 of the BOAS is significantly increased. As shown, the internal cooling passages 780, 782 include interlaced trip strip arrays 788, 790, similar to that shown in FIG. 6.

The configurations illustrated in FIGS. 6-7, related to BOAS applications, may incorporate the spacing, arrangement, alignment, and other features of the trip strip arrays described above with respect to the airfoil configurations. Although such BOAS configurations do not include a leading edge to arrange such trip strip arrays, in the BOAS applications, the trip strip arrays may be arranged relative to dividing walls (e.g., rib partitions 695), side and/or end walls (e.g., leading edge 772 and the trailing edge 774), and the like of the BOAS structure.

As illustrative from the above example embodiments, the applicability of the interlaced trip strip arrays of the present disclosure may be applied more globally within any cooling channel passage where local convective heat transfer augmentation is necessary to reduce local metal temperatures and/or through thickness thermal gradients to mitigate local thermal strain that may be present. Interlaced (i.e., skewed-chevron) trip strip arrays as shown and described herein can provide increased local and bulk heat transfer augmentation beyond conventional skewed and/or chevron trip strip arrays. The integration of skewed-chevron interlaced trip strip arrays enables maximum internal convective heat transfer to be obtained adjacent to, and/or coincident with, high external heat flux locations, typically required for convectively cooled leading edge cooling passage channels, leading and trailing edge BOAS design applications, and blade airfoil tip flags. The application of embodiments of the present disclosure may be extended and applied to all cooling cavity passages where a more uniformly distributed convective heat transfer coefficient is desired to minimize through-wall and in-plane thermal gradients.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, the airfoil comprising:
   an airfoil body having a leading edge defining an internal cavity, wherein an interior surface of the internal cavity along the leading edge comprises an inflection point line extending radially between a root and a tip of the airfoil, wherein the inflection point line is defined at a location of minimum radii that separates a pressure side and a suction side of the airfoil body, and wherein a flow direction through the internal cavity is from the root toward the tip; and
   an interlaced trip strip array arranged within the internal cavity on the interior surface of the internal cavity and arranged proximate the inflection point line, wherein the interlaced trip strip array comprises:
   a chevron trip strip on the interior surface and having an apex, a first ligament extending from the apex in a first direction, and second ligament extending from the apex in a second direction that is different from the first direction to form a chevron shape, wherein the first and second directions are directed in the flow direction toward the tip, and the first ligament being connected to the second ligament at the apex; and
   a skew trip strip arranged on the interior surface, wherein the skew trip strip has a leading end and a trailing end, wherein the leading end of the skew trip strip is proximate the inflection point line and the skew trip strip angles away from the inflection point line in a flow direction with the trailing end being downstream in the flow direction toward the tip, the leading end of the skew trip strip being arranged with an offset from the inflection point line along the interior surface of the internal cavity,
   wherein the skew trip strip is positioned adjacent to and not contacting the chevron trip strip such that a gap is formed on the interior surface between the skew trip strip and the first ligament of the chevron trip strip, and the skew trip strip is oriented between −20° from normal to +20° from normal relative to a direction of the first ligament of the chevron trip strip, the first ligament being closer to the skew trip strip than the second ligament, wherein the offset is less than the gap.

2. The airfoil of claim 1, wherein the chevron trip strip of the interlaced trip strip array is a plurality of the chevron trip strips and the skew trip strip of the interlaced trip strip array is a plurality of the skew trip strips.

3. The airfoil of claim 1, wherein the gap is formed between the trailing end of the skew trip strip and the first ligament of the chevron trip strip.

4. The airfoil of claim 3, wherein the gap is between 8 mil and 30 mil.

5. The airfoil of claim 1, wherein a line drawn from the trailing end of the skew trip strip to the first ligament of the chevron trip strip intersects the first ligament at a position between 50% and 100% of a length of the first ligament of the chevron trip strip from the apex of the chevron trip strip.

6. The airfoil of claim 5, wherein the line drawn from the trailing end to the first ligament intersects at a 90° angle.

7. The airfoil of claim 1, wherein the skew trip strip is located on an upstream side of the chevron trip strip in the flow direction through the internal cavity.

8. The airfoil of claim 1, wherein the skew trip strip is located on a downstream side of the chevron trip strip in the flow direction through the internal cavity.

9. The airfoil of claim 1, wherein the gap is between 8 mil and 30 mil.

10. The airfoil of claim 1, wherein the offset is between 3 mil and 5 mil.

11. The airfoil of claim 1, wherein the offset defines an uninterrupted section along the leading edge of the internal cavity that does not contain any surface features.

12. The airfoil of claim 1, wherein the interlaced trip strip array defines a first interlaced trip strip array and a second interlaced trip strip array, the first interlaced trip strip array being arranged on a pressure side of the internal cavity relative to the inflection point line and the second interlaced trip strip array being arranged on a suction side of the internal cavity relative to the inflection point line.

13. The airfoil of claim 12, wherein the first interlaced trip strip array comprises a plurality of first skew trip strips arranged along the inflection point line and the second interlaced trip strip array comprises a plurality of second skew trip strips arranged along the inflection point line.

14. The airfoil of claim 13, wherein the leading edge of the first skew trip strips and the leading edge of the second skew trip strips are arranged with a radial offset.

15. The airfoil of claim 14, wherein the radial offset is a non-zero pitch.

16. The airfoil of claim 15, wherein the non-zero pitch is equal to ½ pitch.

17. The airfoil of claim 15, wherein the non-zero pitch is equal to ⅓ pitch.

18. The airfoil of claim 15, wherein the non-zero pitch is equal to ¼ pitch.

19. The airfoil of claim 13, wherein each of the plurality of first skew trip strips are arranged upstream of an adjacent chevron trip strip of the first interlaced trip strip array and each of the plurality of second skew strip strips are arranged downstream of an adjacent chevron trip strip of the second interlaced trip strip array.

20. The airfoil of claim 1, wherein a length of the skew trip strip, a length of the first ligament, and a length of the second ligament are all equal.

* * * * *